US011231892B2

(12) United States Patent
Tsuji et al.

(10) Patent No.: US 11,231,892 B2
(45) Date of Patent: *Jan. 25, 2022

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

(71) Applicant: Brother Kogyo Kabushiki Kaisha, Nagoya (JP)

(72) Inventors: Ryoya Tsuji, Nagoya (JP); Hirotaka Asakura, Nagoya (JP); Yusuke Shimada, Owariasahi (JP); Hiroshi Shibata, Obu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,982

(22) Filed: Aug. 2, 2019

(65) Prior Publication Data

US 2019/0354321 A1 Nov. 21, 2019

Related U.S. Application Data

(63) Continuation of application No. 15/887,167, filed on Feb. 2, 2018, now Pat. No. 10,416,941.

(30) Foreign Application Priority Data

Feb. 2, 2017 (JP) .............................. JP2017-017852

(51) Int. Cl.
*G06F 3/12* (2006.01)
*H04W 76/11* (2018.01)
(Continued)

(52) U.S. Cl.
CPC ............ *G06F 3/126* (2013.01); *G06F 3/1204* (2013.01); *G06F 3/1236* (2013.01); (Continued)

(58) Field of Classification Search
CPC .... G06F 3/1222; G06F 3/1247; G06F 3/1287; G06F 3/1292; G06F 3/1238
See application file for complete search history.

(56) References Cited

U.S. PATENT DOCUMENTS 8,848,228 B2 9/2014 Park et al.
9,094,782 B2 7/2015 Asai
(Continued)

FOREIGN PATENT DOCUMENTS

CN 103716904 A 4/2014
CN 104813735 A 7/2015
(Continued)

OTHER PUBLICATIONS

Wi-Fi Alliance Technical Committee P2P Task Group, "Wi-Fi Peer-to Peer (P2P) Technical Specification", Version 1.5, pp. 1-183, 2014.

(Continued)

*Primary Examiner* — Huo Long Chen
(74) *Attorney, Agent, or Firm* — Banner & Witcoff, Ltd.

(57) ABSTRACT

A communication device may, in a specific situation where the communication device is in a parent station state in which the communication device operates as a parent station of a first wireless network and N pieces of first external devices participate in the first wireless network as child stations, receive a belonging request from a second external device. The communication device may shift from the parent station state to a first state, in a case where the belonging request is received in the specific situation, execute a wireless communication of target data with the second external (Continued)

device, shift from the first state to the parent station state, and cause M pieces of the first external devices among the N pieces of the first external devices to participate in the first wireless network again as child stations after the communication device has been shifted to the parent station state.

19 Claims, 10 Drawing Sheets

(51) Int. Cl.
  *H04W 4/80* (2018.01)
  *H04N 1/00* (2006.01)
  *H04W 4/50* (2018.01)
(52) U.S. Cl.
  CPC ....... *G06F 3/1292* (2013.01); *H04N 1/00204* (2013.01); *H04N 1/00278* (2013.01); *H04W 4/50* (2018.02); *H04W 4/80* (2018.02); *H04W 76/11* (2018.02); *H04N 2201/0094* (2013.01)

(56) References Cited

U.S. PATENT DOCUMENTS

| | | | |
|---|---|---|---|
| 10,416,941 B2* | 9/2019 | Tsuji | G06F 3/126 |
| 2006/0101280 A1 | 5/2006 | Sakai | |
| 2011/0085529 A1 | 4/2011 | Choi et al. | |
| 2011/0225305 A1 | 9/2011 | Vedantham et al. | |
| 2012/0099566 A1 | 4/2012 | Laine et al. | |
| 2012/0134349 A1 | 5/2012 | Jung et al. | |
| 2012/0173620 A1 | 7/2012 | Holostov et al. | |
| 2012/0224569 A1 | 9/2012 | Kubota | |
| 2012/0265913 A1 | 10/2012 | Suumaki et al. | |
| 2012/0278389 A1 | 11/2012 | Thangadorai | |
| 2012/0317199 A1 | 12/2012 | Nam et al. | |
| 2013/0045678 A1 | 2/2013 | Lee | |
| 2013/0128311 A1 | 5/2013 | Kim et al. | |
| 2013/0194962 A1 | 8/2013 | Abraham et al. | |
| 2013/0217324 A1 | 8/2013 | Lee et al. | |
| 2013/0250354 A1 | 9/2013 | Kato et al. | |
| 2013/0258390 A1 | 10/2013 | Suzuki et al. | |
| 2013/0260682 A1 | 10/2013 | Suzuki et al. | |
| 2013/0260683 A1* | 10/2013 | Suzuki | H04W 76/11 455/41.1 |
| 2013/0260818 A1 | 10/2013 | Suzuki et al. | |
| 2014/0091987 A1 | 4/2014 | Lee et al. | |
| 2014/0094211 A1 | 4/2014 | Ren | |
| 2014/0176981 A1 | 6/2014 | Asai | |
| 2014/0179317 A1 | 6/2014 | Tanaka | |
| 2014/0320908 A1 | 10/2014 | Iwauchi et al. | |
| 2015/0092231 A1* | 4/2015 | Shibata | H04W 76/36 358/1.15 |
| 2015/0117340 A1 | 4/2015 | Kawakami et al. | |
| 2015/0189462 A1 | 7/2015 | Fujii et al. | |
| 2015/0195686 A1 | 7/2015 | Yu | |
| 2015/0245393 A1 | 8/2015 | Lee et al. | |
| 2015/0249946 A1 | 9/2015 | Oh | |
| 2015/0304805 A1 | 10/2015 | Suzuki et al. | |
| 2015/0365985 A1* | 12/2015 | Terashita | H04W 76/10 370/329 |
| 2015/0373763 A1* | 12/2015 | Ren | H04W 76/10 370/338 |
| 2016/0100394 A1 | 4/2016 | Tachiwa | |
| 2016/0165384 A1 | 6/2016 | Amano | |
| 2016/0316511 A1 | 10/2016 | Suzuki et al. | |
| 2017/0085638 A1 | 3/2017 | Lee et al. | |
| 2017/0195948 A1 | 7/2017 | Tanaka | |
| 2017/0208431 A1 | 7/2017 | Suzuki et al. | |
| 2017/0346891 A1 | 11/2017 | Yasuda et al. | |
| 2018/0069761 A1 | 3/2018 | Iwami et al. | |
| 2018/0242303 A1 | 8/2018 | Tachiwa | |
| 2019/0075442 A1 | 3/2019 | Suzuki et al. | |
| 2019/0082384 A1 | 3/2019 | Tanaka | |
| 2019/0394628 A1 | 12/2019 | Suzuki et al. | |

FOREIGN PATENT DOCUMENTS

| | | |
|---|---|---|
| JP | 2013-214803 A | 10/2013 |
| JP | 2013-214804 A | 10/2013 |
| JP | 2013-219420 A | 10/2013 |
| JP | 2014-127819 A | 7/2014 |
| JP | 2014-127871 A | 7/2014 |
| JP | 2014220700 | 11/2014 |
| JP | 2016-076744 A | 5/2016 |
| WO | 2016/098275 A1 | 6/2016 |

OTHER PUBLICATIONS

Wi-Fi Alliance, "Wi-Fi Peer-to-Peer P2P Technical Specification", Version 1.5, pp. 1-183, 2014.
Sep. 19, 2018—U.S. Non-Final Office Action—U.S. Appl. No. 15/871,562.
Feb. 20, 2019—U.S. Notice of Allowance—U.S. Appl. No. 15/871,562.
Aug. 25, 2020—(JP) Notification of Reasons for Rejection—App 2017-004960.
Nov. 3, 20210 (CN) Notification of First Office Action—App 201810105254.8.

* cited by examiner

FIG. 1
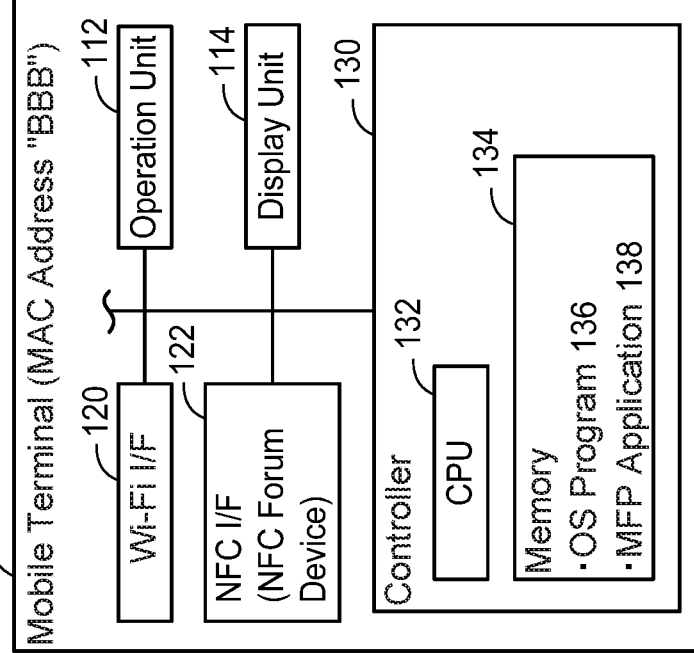
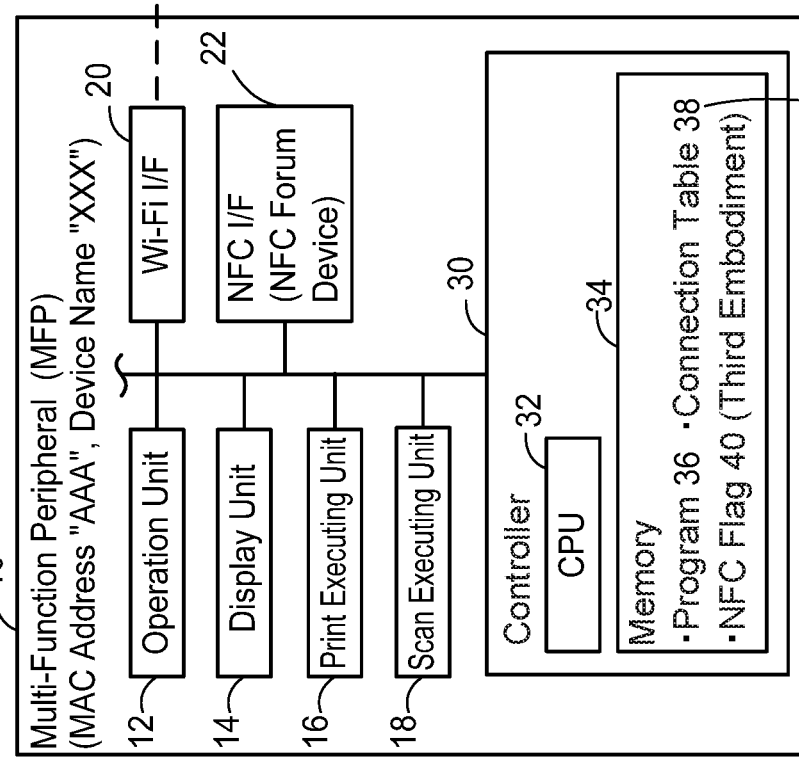

FIG. 9 (Third Embodiment)

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

CROSS-REFERENCE TO RELATED APPLICATION

This application is a continuation of U.S. patent application Ser. No. 15/887,167 filed Feb. 2, 2018 which claims priority to Japanese Patent Application No. 2017-017852, filed on Feb. 2, 2017, the entire contents of which are hereby incorporated by reference into the present application.

TECHNICAL FIELD

The disclosure herein discloses a communication device capable of operating as a parent station of a wireless network.

BACKGROUND ART

A communication system including a first MFP, a second MFP, an information processing device, a first access point, and a second access point is known. A specific network is formed by the second MFP and the second access point, and a different network different from the specific network is formed by the first MFP and the first access point. In a case where the information processing device is to send print data to the first MFP while in a state of being connected to the specific network, the information processing device connects to the different network, sends the print data to the first MFP, and then re-connects to the specific network after the communication of data to the first MFP has been completed.

SUMMARY

In the above technique, the information processing device shifts from the state of participating as a child station in the specific network to a state of participating as a child station in the different network, and returns to the original state after the communication of data has been completed. However, no consideration has been given to a situation where the information processing device operates as a parent station of a wireless network.

The disclosure herein discloses a technique for reconstructing a wireless network in which a communication device is operating as a parent station and an external device is participating as a child station.

A communication device disclosed herein may comprise a wireless interface; a processor; and a memory storing computer-readable instructions therein, the computer-readable instructions, when executed by the processor, causing the communication device to: in a specific situation where an operation state of the communication device is a parent station state in which the communication device operates as a parent station of a first wireless network and N pieces (the N being an integer of 1 or more) of first external devices participate in the first wireless network as child stations, receive a belonging request from a second external device different from the N pieces of the first external devices via the wireless interface, the belonging request being a command for requesting the communication device to belong to a second wireless network different from the first wireless network; shift the operation state of the communication device from the parent station state to a first state where the communication device belongs to the second wireless network, in a case where the belonging request is received from the second external device in the specific situation; execute a wireless communication of target data with the second external device via the wireless interface by using the second wireless network after the operation state of the communication device has been shifted from the parent station state to the first state; shift the operation state of the communication device from the first state to the parent station state after the wireless communication of the target data has been completed; and cause M pieces (the M being integer of 1 or more and less than or equal to the N) of the first external devices among the N pieces of the first external devices to participate in the first wireless network again as child stations after the operation state of the communication device has been shifted from the first state to the parent station state.

A control method, computer-readable instructions, and a non-transitory computer-readable recording medium storing the computer-readable instructions, for implementation of the aforementioned communication device are also novel and useful. A communication system which comprises the aforementioned communication device, first external device and second external device is also novel and useful.

BRIEF DESCRIPTION OF THE DRAWINGS

FIG. 1 shows a configuration of a communication system.

EMBODIMENTS

Figure 2:
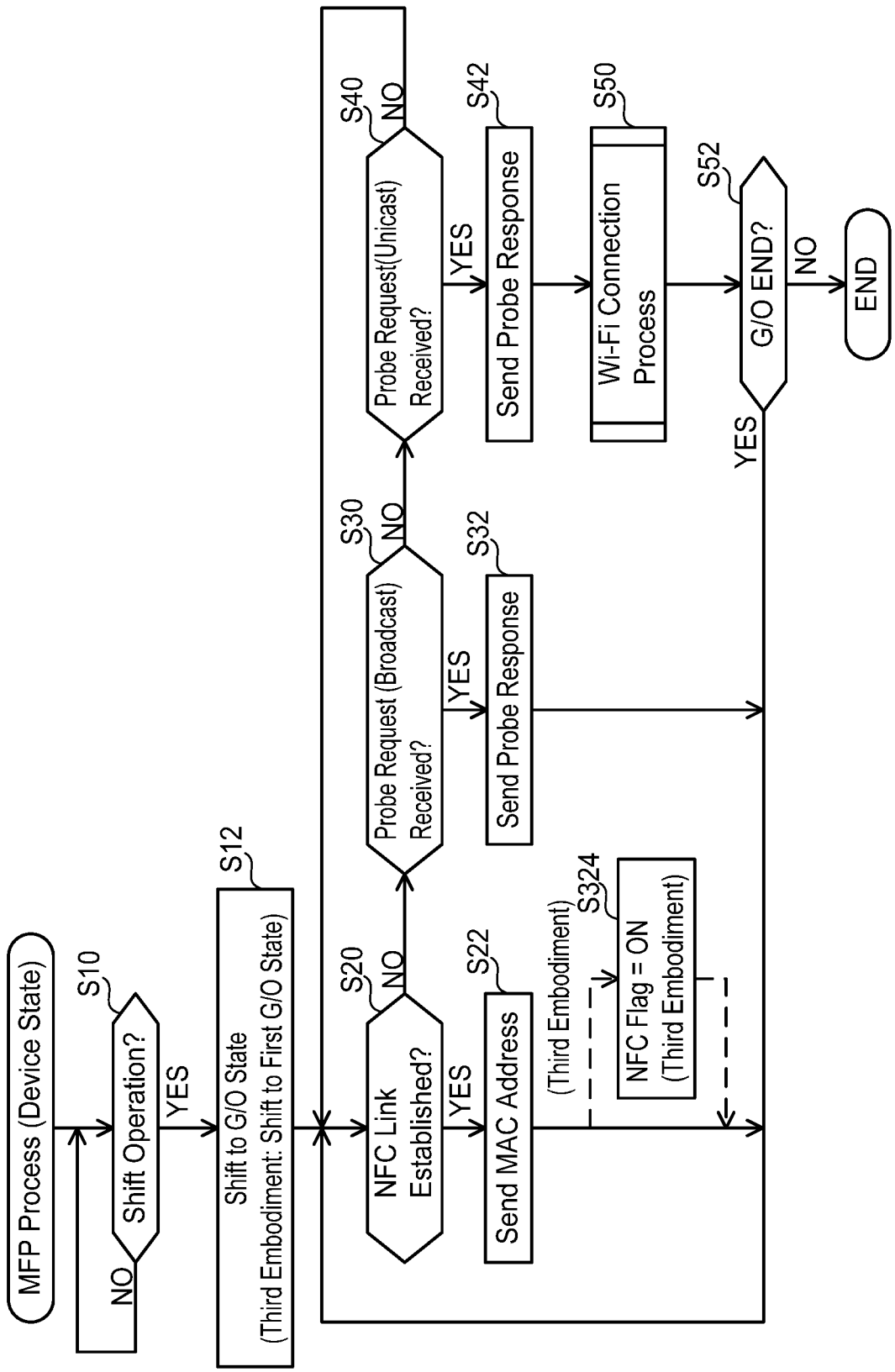
FIG. 2 shows a flowchart of an MFP process.

First Embodiment (Configuration of Communication System 2; FIG. 1)
As shown in FIG. 1, a communication system 2 comprises a multi-function peripheral 10 (called "MFP" below), a mobile terminal 100 and a plurality of PCs 200, 300. The MFP 10 and the mobile terminal 100 are capable of mutually executing a Wi-Fi communication, which is a wireless communication according to Wi-Fi scheme, and mutually executing an NFC (abbreviation of Near Field Communication) communication, which is a wireless communication according to NFC scheme. The MFP 10 and the each of the PCs 200, 300 are capable of mutually executing a Wi-Fi communication.

(Configuration of MFP 10)
The MFP 10 is a peripheral device (e.g., a peripheral device of a PC 200, etc.) capable of executing multiple functions including a print function and a scan function. A MAC address "AAA" and a device name "XXX" are allocated to the MFP 10. The MFP 10 comprises an operation unit 12, a display unit 14, a print executing unit 16, a scan executing unit 18, a Wi-Fi interface (interface is denoted as "I/F" below) 20, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. Below, the operation unit 12 and the display unit 14 may collectively be referred to as "MFP operation unit". The print executing unit 16 is a printing mechanism such as an ink jet scheme, laser scheme, or the like. The scan executing unit 18 is a scanning mechanism such as CCD, CIS, or the like.

The Wi-Fi I/F 20 is an I/F for executing a Wi-Fi communication according to the Wi-Fi scheme. The Wi-Fi scheme is a wireless communication scheme based on, for example, the standard of IEEE (abbreviation of The Institute of Electrical and Electronics Engineers, Inc.) 802.11 and standards conforming thereto (e.g., 802.11a, 11b, 11g, 11n, or the like). The Wi-Fi I/F 20 supports, in particular, WFD (abbreviation of Wi-Fi Direct (registered trademark)) scheme developed by the Wi-Fi Alliance. The WFD scheme is a wireless communication scheme described in the standard document "Wi-Fi Peer-to-Peer (P2P) Technical Specification Version 1.5" created by the Wi-Fi Alliance.

The MFP 10 can operate in any state of Group Owner state, Client state, and device state according to the WFD scheme. Below, Group Owner and Client are referred to as "G/O" and "CL", respectively. In a case of the MFP 10 operating in the G/O state, the MFP 10 forms a WFD network (referred to as "WFDNW" below) in which the MFP 10 operates as a parent station (i.e., as G/O). Then, the MFP 10 establishes a Wi-Fi connection with an external apparatus, and allows the external apparatus to participate in the WFDNW as a child station. For example, in a case where the external apparatus is a device supporting the WFD scheme (referred to as "WFD apparatus" below), the external apparatus operates in the CL state, and participates in the WFDNW as a child station (i.e., as CL). Further, for example, in a case where the external apparatus does not support the WFD scheme, that is, in a case where the external apparatus is a legacy apparatus, the external apparatus participates in the WFDNW as a child station (i.e., as legacy) without operating in any of the states of the WFD scheme. There is a predetermined upper limit for a number of child stations that can participate in the WFDNW in which the MFP 10 operates as the parent station, and in the present embodiment, the upper limit is "2". It should be noted, in a modification, the upper limit may be "1" or "3" or more. Further, in a case where the external apparatus operates in the G/O state, the MFP 10 operates in the CL state. In that case, the MFP 10 establishes a Wi-Fi connection with the external apparatus, and can participate in the WFDNW formed by the external apparatus as a child station (i.e., as CL). It should be noted that the device state is a state that is neither the G/O state nor the CL state, that is, the device state is a state in which the MFP 10 is not establishing a connection with the external apparatus.

The NFC I/F 22 is an I/F for executing an NFC communication according to the NFC (abbreviation of Near Field Communication) scheme. The NFC scheme is a wireless communication scheme based on international standards such as ISO/IEC14443, 15693, 18092. It should be noted that an I/F called an NFC forum device, and an I/F called an NFC forum tag are known as types of I/F for executing an NFC communication. The NFC I/F 22 is an NFC forum device, and is capable of selectively operating in any of P2P (abbreviation of Peer To Peer) mode, R/W (abbreviation of Reader/Writer) mode, and CE (abbreviation of Card Emulation) mode.

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave in a Wi-Fi communication via the Wi-Fi I/F 20 (e.g. 2.4 GHz band or 5.0 GHz band) is different from a frequency of a carrier wave in an NFC communication via the NFC I/F 22 (e.g. 13.56 MHz band). Further, a maximum distance with which a Wi-Fi communication via the Wi-Fi I/F 20 can be executed (e.g., approximately 100 m at maximum) is greater than a maximum distance with which an NFC communication via the NFC I/F 22 can be executed (e.g., approximately 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, or the like. Further, the memory 34 stores a connection table 38.

For each of the one or more external apparatuses which has established a Wi-Fi connection with the MFP 10 in the past, device information of the external apparatus is registered in the connection table 38. The device information includes MAC address of the external apparatus, legacy information, and connection information. The legacy information is information indicating whether the external apparatus is a legacy apparatus. "YES" indicates that the external apparatus is a legacy apparatus, and "NO" indicates that the external apparatus is a WFD apparatus. The connection information is information indicating whether the external apparatus is currently participating as a child station in the WFDNW in which the MFP 10 is operating as the G/O. "YES" indicates that the external apparatus is participating in the WFDNW, and "NO" indicates that the external apparatus is not participating in WFDNW (i.e., has participated in the past). The device information is stored when the Wi-Fi connection between the MFP 10 and the external apparatus is initially established.

(Configuration of Mobile Terminal 100)

The mobile terminal 100 is a portable terminal device such as a mobile telephone, a smartphone, a PDA, a notebook PC, a tablet PC, a portable music playback device or a portable movie playback device. A MAC address "BBB" is allocated to the mobile terminal 100. The mobile terminal 100 comprises an operation unit 112, a display unit 114, a Wi-Fi I/F 120, an NFC I/F 122, and a controller 130.

The operation unit 112 comprises a plurality of keys. The user can input various instructions to the mobile terminal 100 by operating the operation unit 112. The display unit 114 is a display for displaying various information. The display unit 114 also functions as a so-called touch panel. That is, the display unit 114 also functions as an operation unit. Below, the operation unit 112 and the display unit 114 may collectively be termed "terminal operation unit". The Wi-Fi I/F 120 and the NFC I/F 122 are the same as the Wi-Fi I/F 20 and the NFC I/F 22 of the MFP 10, respectively.

The controller 130 comprises a CPU 132 and a memory 134. The CPU 132 executes various processes in accordance with programs 136, 138 stored in the memory 134. An OS (abbreviation of Operating System) program 136 is a program for controlling various basic operations of the mobile terminal 100. Further, the MFP application 138 is an application provided by a vendor of the MFP 10, and is installed in the mobile terminal 100 from, for example, a server on the Internet. The MFP application 138 is an application for establishing a Wi-Fi connection between the mobile terminal 100 and the MFP 10, and executing a communication of target data (e.g., print data, scan data) by using the Wi-Fi connection. Below, the MFP application 138 is simply called "application 138".

(Configuration of PCs 200, 300)

The PCs 200, 300 may be stationary PCs or portable PCs. MAC addresses "CCC", "DDD" are allocated to the PC 200, PC 300, respectively. The PC 200 is a legacy apparatus, and the PC 300 is a WFD apparatus.

(Process Executed by MFP; FIG. 2)

Next, contents of a process executed by the CPU 32 of the MFP 10 in accordance with the program 36 will be described with reference to FIG. 2. When the power of the MFP 10 is turned ON, the MFP 10 shifts to the device state of the WFD scheme. The CPU 32 executes the process of FIG. 2 in this state.

In S10, the CPU 32 monitors whether a shift operation is executed on the MFP operation unit by the user. The shift operation is an operation for instructing shifting of the operation state of the MFP 10 from the device state to the G/O state. In a case where the shift operation is executed by the user, the CPU 32 determines YES in S10, and proceeds to S12.

In S12, the CPU 32 shifts the operation state of the MFP 10 from the device state to the G/O state. Thereby, the MFP 10 forms a first WFDNW in which the MFP 10 operates as a parent station (i.e., G/O state), and generates first wireless setting information (e.g., SSID "YYY1", password "PPP1", or the like) to be used in the first WFDNW.

In S20, the CPU 32 monitors whether an NFC link is established between the MFP 10 and the mobile terminal 100. When the user brings the mobile terminal 100 closer to the MFP 10, a distance between the NFC I/F 122 of the mobile terminal 100 and the NFC I/F 22 of the MFP 10 becomes shorter than the maximum distance with which an NFC communication can be executed (e.g., 10 cm). As a result, an NFC link between the MFP 10 and the mobile terminal 100 is established. In a case of acquiring from the NFC I/F 22 establishment information indicating that the NFC link has been established, the CPU 32 determines YES in S20, and proceeds to S22.

In S22, the CPU 32 sends the MAC address "AAA" of the MFP 10 to the mobile terminal 100 by using the established NFC link (i.e., via the NFC I/F 22).

Further, simultaneously with the monitoring of S20, in S30, the CPU 32 monitors whether a Probe request is received from a target apparatus (e.g., the PC 200, or the like.) via the Wi-Fi I/F 20. The Probe request is a signal sent by broadcast from the target apparatus (i.e., a signal having a destination which is not specified), and is a signal for searching for a device capable of establishing a Wi-Fi connection. Upon receiving the Probe request (YES in S30), in S32, the CPU 32 sends a Probe response including the MAC address "AAA" and the SSID "YYY1" to the target apparatus via the Wi-Fi I/F 20.

Further, simultaneously with the monitoring of S20 and S30, in S40, the CPU 32 monitors whether a Probe request is received from the target apparatus via the Wi-Fi I/F 20. The Probe request includes the MAC address "AAA" of the MFP 10. That is, the Probe request is a signal sent by unicast from the target apparatus (i.e., a signal having a destination which is specified), and is a signal requesting the MFP 10 to establish a Wi-Fi connection. Upon receiving the Probe request (YES in S40), in S42, the CPU 32 sends a Probe response including the MAC address "AAA" and the SSID "YYY1" to the target apparatus via the Wi-Fi I/F 20. Thereby, the MFP 10 can inform the target apparatus that it is possible to establish a Wi-Fi connection with the MFP 10.

In S50, the CPU 32 executes a Wi-Fi connection process (see FIG. 3 and FIG. 4) for establishing a Wi-Fi connection with the target apparatus.

In S52, the CPU 32 determines whether the operation state of the MFP 10 after execution of the Wi-Fi connection process is the G/O state. In a case where the operation state of the MFP 10 is the G/O state (see "G/O END" of FIG. 3 and FIG. 4), the CPU 32 determines YES in S52, and returns to the monitoring of S20, S30, and S40. On the other hand, in a case where the operation state of the MFP 10 is the device state (see "Device END" of FIG. 3 and FIG. 4), the CPU 32 determines NO in S52, and returns to S10 of FIG. 2.

Figure 3:
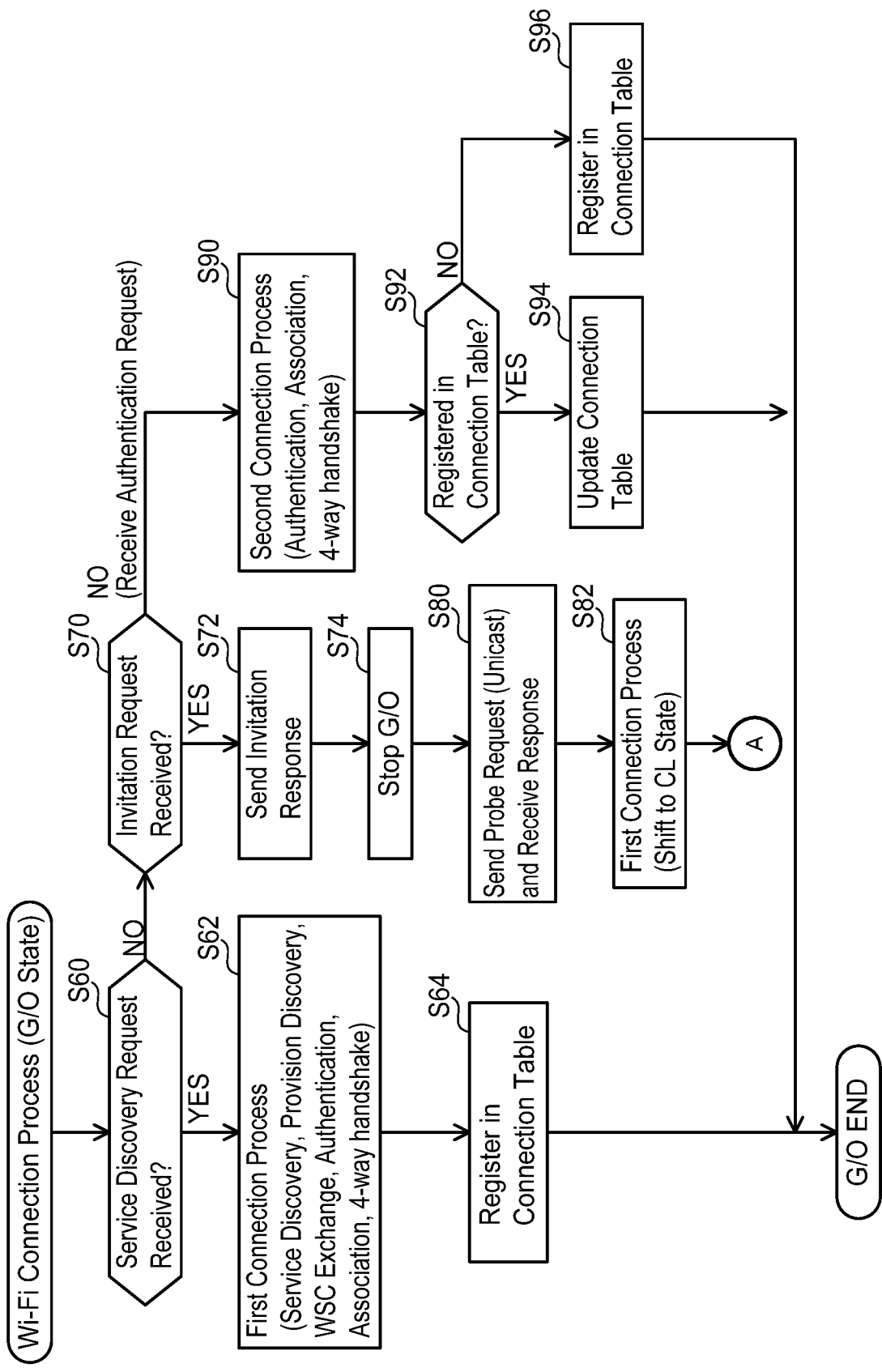
FIG. 3 shows a flowchart of a Wi-Fi connection process.
Figure 4:
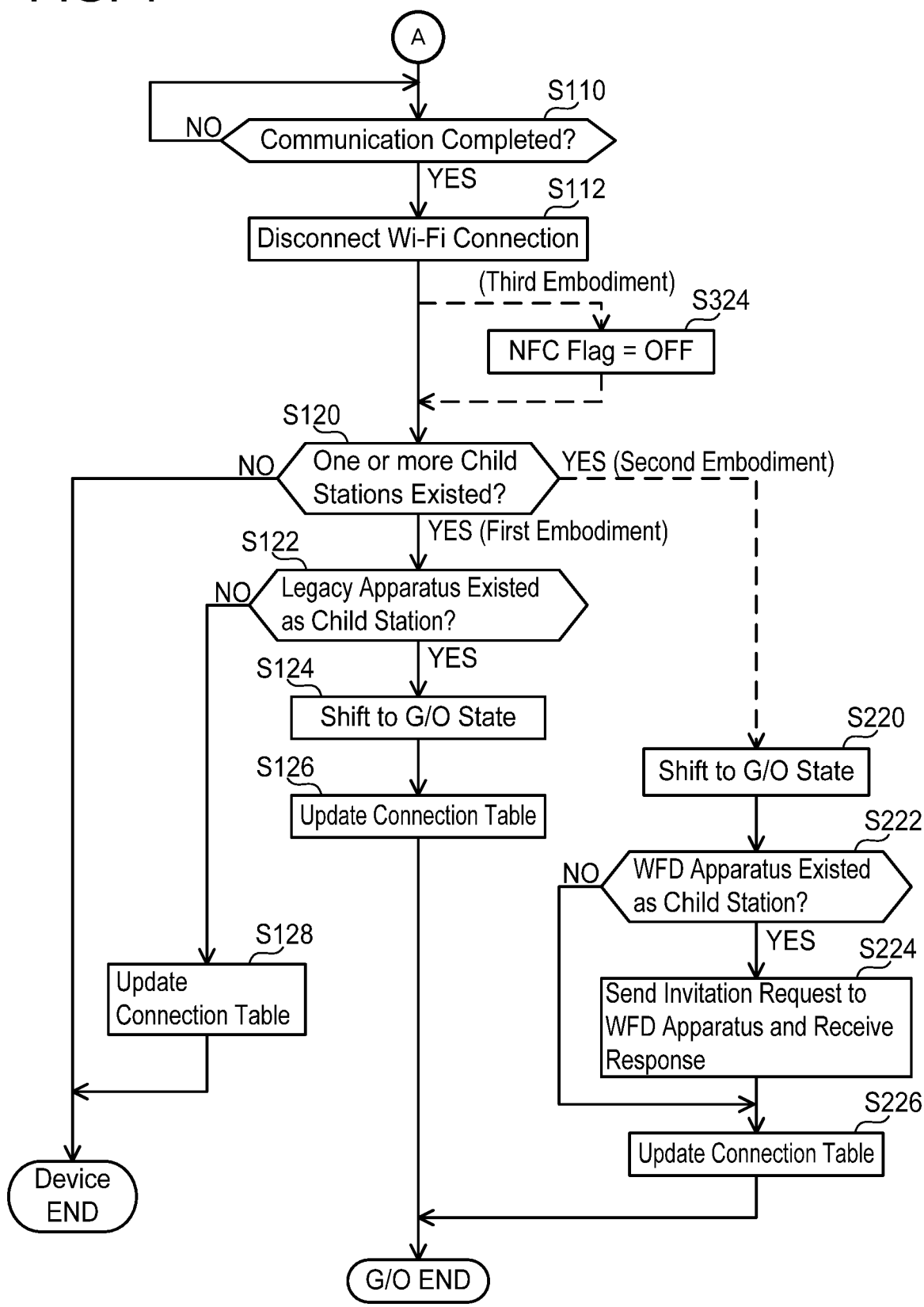
FIG. 4 shows a flowchart of a continuation of FIG. 3.

(Wi-Fi Connection Process; FIG. 3 and FIG. 4)

Next, the Wi-Fi connection process executed in S50 of FIG. 2 will be described with reference to FIG. 3 and FIG. 4. It should be noted that all communications in FIG. 3 and FIG. 4 are executed via the Wi-Fi I/F 20. Therefore, in the description below, the explanation "via the Wi-Fi I/F 20" is omitted.

In S60, the CPU 32 monitors whether a Service Discovery request is received from the target apparatus. The Service Discovery request is a signal received from the target apparatus, which is a WFD apparatus that does not store Persistent information. The Persistent information is wireless setting information used for establishing a Wi-Fi connection between the MFP 10 and the target apparatus in the past. For example, in a case where the target apparatus has participated, as a child station, in a first WFDNW in which the MFP 10 operates as a parent station (i.e., G/O state) in the past, the Persistent information stored in the target apparatus includes the MAC address "AAA" of the MFP 10, the SSID "YYY1" of the first WFDNW, and the password "PPP1" used in the first WFDNW. Upon receiving the Service Discovery request from the target apparatus, the CPU 32 determines YES in S60, and proceeds to S62.

In S62, the CPU 32 executes a first connection process for establishing a Wi-Fi connection with the target apparatus. Viewed from the MFP 10 which is in the G/O state, the first connection process includes sending a response to the Service Discovery request received in S60, receiving a Provision Discovery request, sending a response thereto, communication of a WSC Exchange, receiving an Authentication request, sending a response thereto, receiving an Association request, sending a response thereto, and communication of a 4-way handshake. In the WSC Exchange, the CPU 32 sends the first wireless setting information (i.e., the SSID "YYY1", the password "PPP1", etc.) to be used in the first WFDNW to the target apparatus. Thereby, the CPU 32 establishes a Wi-Fi connection with the target apparatus, and causes the target apparatus to participate as a child station in the first WFDNW.

In S64, the CPU 32 registers information relating to the target apparatus in the connection table 38. Specifically, the CPU 32 registers a MAC address of the target apparatus, the legacy information "NO", and the connection information "YES", in the connection table 38. When S64 ends, the CPU 32 ends the process of FIG. 3 as "G/O END". As a result, the CPU 32 determines YES in S52 of FIG. 2, and returns to S20, etc.

Further, simultaneously with the monitoring of S60, in S70, the CPU 32 monitors whether an Invitation request is received from the target apparatus. The Invitation request is received from a target apparatus that is a WFD apparatus operating as a parent station (i.e., G/O) of a second WFDNW. The Invitation request is a command for requesting participation as a child station in the second WFDNW. Upon receiving the Invitation request from the target apparatus, the CPU 32 determines YES in S70, and proceeds to S72.

At the present time, the MFP 10 is operating as the G/O, and forms the first WFDNW. Accordingly, the MFP 10 cannot participate in the second WFDNW. For this reason, in S72, the CPU 32 sends, to the target apparatus, an Invitation response including NG information indicating that the MFP 10 cannot participate in the second WFDNW.

In S74, the CPU 32 sends a disconnection request to the target apparatus participating in the first WFDNW and, after the Wi-Fi connection with the target apparatus has been disconnected, shifts the operation state of the MFP 10 from the G/O state to the device state. Thereby, the first WFDNW disappears. By shifting to the device state, the MFP 10 reaches a state of being able to participate as a child station in the second WFDNW.

In S80, the CPU 32 sends a Probe request including the MAC address of the target apparatus to the target apparatus. It should be noted that the MAC address of the target apparatus is included in the Invitation request received in S70. In S80, in response to the sending of the Probe request, the CPU 32 further receives, from the target apparatus, a Probe response including the MAC address of the target apparatus.

In S82, the CPU 32 executes a first connection process. Compared to the first connection process executed in S62, the apparatus that transmits information and the apparatus that receives information are reversed in the first connection process executed in S82. Specifically, seen from the MFP 10, the first connection process of S82 includes sending a Service Discovery request, receiving a response thereto, sending a Provision Discovery request, receiving a response thereto, communication of a WSC Exchange, sending an Authentication request, receiving a response thereto, sending an Association request, receiving a response thereto, and communication of a 4-way handshake. Then, in the WSC Exchange, the CPU 32 receives, from the target apparatus, second wireless setting information (i.e., SSID, password, etc.) to be used in the second WFDNW. Thereby, the CPU 32 shifts the operation state of the MFP 10 from the device state to the CL state, establishes a Wi-Fi connection with the target apparatus, and participates as a child station (i.e., CL) in the second WFDNW. Thereafter, although not shown, the CPU 32 executes a communication of target data (e.g., print data, scan data, etc.) with the target apparatus by using the Wi-Fi connection. When S82 ends, the CPU 32 proceeds to S110 of FIG. 4.

In S110 of FIG. 4, the CPU 32 monitors whether communication of the target data is completed. For example, in a case where receiving from the target apparatus of print data representing an image of a print target is completed, or in a case where sending to the target apparatus of scan data generated by scanning is completed, the CPU 32 determines YES in S110, and proceeds to S112.

In S112, the CPU 32 shifts the operation state of the MFP 10 from the CL state to the device state, and disconnects the Wi-Fi connection with the target apparatus.

In S120, the CPU 32 determines whether one or more child stations were participating in the first WFDNW when the first WFDNW disappeared in S74 of FIG. 3. In a case where one or more pieces of device information including the connection information "YES" are present in the connection table 38, the CPU 32 determines YES in S120, and proceeds to S122. Below, the device information including the connection information "YES" is called "participating device information".

On the other hand, in a case where not even one piece of participating device information is present in the connection table 38, i.e., in a case where all the device information includes the connection information "NO", the CPU 32 determines NO in S120, and ends the process of FIG. 4 as "Device END". As a result, the CPU 32 determines NO in S52 of FIG. 2, and returns to S10. The determination of NO in S120 means that not even one child station was participating in the first WFDNW when the first WFDNW disappeared. Accordingly, there is little need for the MFP 10 to return to the G/O state and again form the first WFDNW. For this reason, the MFP 10 operates in the device state without returning to the G/O state. Power consumption in the device state is usually lower than power consumption in the G/O state. Consequently, power saving can be realized.

In S122, the CPU 32 determines whether one or more legacy apparatuses was participating in the first WFDNW when the first WFDNW disappeared in S74 of FIG. 3. In a case where any participating device information in the connection table 38 includes the legacy information "YES", the CPU 32 determines YES in S122, and proceeds to S124.

On the other hand, in a case where no participating device information in the connection table 38 includes the legacy information "YES", i.e., in a case where all the participating device information includes the legacy information "NO", the CPU 32 determines NO in S122, and updates the connection table 38 in S128. Specifically, the CPU 32 updates the connection information from "YES" to "NO" for all the participating device information. Then, the CPU 32 ends the process of FIG. 4 as "Device END". As a result, the CPU 32 determines NO in S52 of FIG. 2, and returns to S10. The determination of NO in S122 means that only a WFD apparatus was participating in the first WFDNW when the first WFDNW disappeared. Unless some instruction is given, the WFD apparatus does not execute a process for re-establishing a Wi-Fi connection with the MFP 10 after the Wi-Fi connection with the MFP 10 operating as G/O has been disconnected. In the present embodiment, since a mechanism for giving the instruction to the WFD apparatus is not adopted, even if the MFP 10 returns to the G/O state and again forms the first WFDNW, the WFD apparatus does not automatically again participate in the first WFDNW. In view of such circumstances, in a case where only the WFD apparatus was participating in the first WFDNW when the first WFDNW disappeared, the MFP 10 operates in the device state without returning to the G/O state. For this reason, power saving can be realized.

In S124, the CPU 32 shifts the operation state of the MFP 10 from the device state to the G/O state. Thereby, the MFP 10 re-forms the first WFDNW, and re-generates the first wireless setting information to be used in the WFDNW.

S126 is the same as S128. When S126 ends, the CPU 32 ends the process of FIG. 4 as "G/O END". As a result, the CPU 32 determines YES in S52 of FIG. 2, and returns to S20, etc. The determination of YES in S122 means that a legacy apparatus was participating in the first WFDNW when the first WFDNW disappeared. The legacy apparatus may automatically execute a process for re-establishing a Wi-Fi connection with the MFP 10 after the Wi-Fi connection with the MFP 10 that operates as G/O has been disconnected. For this reason, when the MFP 10 returns to the G/O state and again forms the first WFDNW, the legacy apparatus is automatically able to participate in the first WFDNW. In view of such circumstances, in a case where the legacy apparatus participated in the first WFDNW when the first WFDNW disappeared, the MFP 10 returns to the G/O state and again forms the first WFDNW. Thereby, the MFP 10 re-establishes the Wi-Fi connection with the legacy apparatus specified by the participating device information including the legacy information "YES", and is able to cause the legacy apparatus to again participate in the first WFDNW.

The description of S70 of FIG. 3 will be returned to. In a case where an Invitation request is not received (NO in S70), i.e., in a case of where an Authentication request is received from the target apparatus, in S90, the CPU 32 executes a second connection process for establishing a Wi-Fi connection with the target apparatus. The Authentication request is received from a target apparatus which is a legacy apparatus, or is received from a target apparatus which is a WFD apparatus that stores the Persistent information. The second connection process includes sending a response to the Authentication request, receiving an Association request, sending a response thereto, and communication of a 4-way handshake. Thereby, the CPU 32 establishes a Wi-Fi connection with the target apparatus, and causes the target apparatus to participate in the first WFDNW as a child station.

In S92, the CPU 32 determines whether the device information corresponding to the target apparatus with which the Wi-Fi connection was established in S90 has been registered in the connection table 38. In a case where the device information including the MAC address of the target apparatus is registered in the connection table 38, the CPU 32 determines YES in S92 and, in S94, updates the connection information included in the device information from "NO" to "YES". On the other hand, in a case where the device information including the MAC address of the target apparatus is not registered in the connection table 38, the CPU 32 determines NO in S92, and proceeds to S96. As described above, in the situation where S90 and S92 are executed, the target apparatus is either a legacy apparatus, or a WFD apparatus that stores the Persistent information. In the case where the target apparatus is the WFD apparatus, the MFP 10 has established a Wi-Fi connection with the WFD apparatus in the past, and as a result the device information of the WFD apparatus is registered in the connection table 38. Accordingly, in the situation where NO is determined in S92, the target apparatus is a legacy apparatus which has not established a Wi-Fi connection with the MFP 10 in the past.

In S96, the CPU 32 registers the device information of the target apparatus (i.e., the legacy apparatus) in the connection table 38. The device information includes the MAC address of the target apparatus, the legacy information "YES", and the connection information "YES". When S94 or S96 ends, the CPU 32 ends the process of FIG. 3 as "G/O END". As a result, the CPU 32 determines YES in S52 of FIG. 2, and returns to S20, etc.

(Specific Case)

Next, a specific case realized by the processes of FIG. 2 to FIG. 4 will be described with reference to FIG. 5 to FIG. 7.

(Establishment of Wi-Fi Connection Between MFP 10 and PCs 200, 300; FIG. 5)

When a shift operation is executed on the MFP 10 by the user in T10 (YES in S10 of FIG. 2), in T12, the MFP 10 shifts from the device state to the G/O state, forms the first WFDNW, and generates the first wireless setting information (i.e., the SSID "YYY1", the password "PPP1", etc.) to be used in the first WFDNW (S12).

When a search operation is executed by the user in T20, the PC 200 sends a Probe request by broadcast in T22. The search operation is an operation for searching for a device capable of establishing a Wi-Fi connection with the PC 200.

Upon receiving the Probe request from the PC 200 in T22 (YES in S30), in T24, the MFP 10 sends a Probe response including the MAC address "AAA" and the SSID "YYY1" to the PC 200 (S32).

Upon receiving the Probe response from the MFP 10 in T24, the PC 200 displays, in T26, a selection screen including the SSID "YYY1" included in the Probe response and, in T28, accepts selection of the SSID "YYY1" and input of the password "PPP1". Then, in T30, the PC 200 sends a Probe request including the MAC address "AAA" to the MFP 10.

Upon receiving the Probe request from the PC 200 in T30 (YES in S40), in T32, the MFP 10 sends a Probe response including the MAC address "AAA" and the SSID "YYY1" to the PC 200 (S42).

Upon sending the Probe response, the MFP 10 receives an Authentication request from the PC 200 which is a legacy apparatus (NO in S70 of FIG. 3) and, in T40, executes the second connection process (i.e., communication of Authentication, Association, 4-way handshake), and establishes a Wi-Fi connection with the PC 200 (S90).

By establishing a Wi-Fi connection with the MFP 10, in T42, the PC 200 participates as a child station (i.e., legacy) in the first WFDNW and, in T44, stores the MAC address "AAA" of the MFP 10, and the first wireless setting information selected and input in T28 (i.e., the SSID "YYY1", the password "PPP1"), as re-connection information. Thereby, in a case where the Wi-Fi connection with the MFP 10 is to be re-established after the Wi-Fi connection with the MFP 10 has been disconnected, the PC 200 is able to re-establish the Wi-Fi connection with the MFP 10 by using the re-connection information without the password "PPP1" being inputted by the user.

The MFP 10 determines that device information including the MAC address "CCC" of the PC 200 is not registered in the connection table 38 (NO in S92 of FIG. 3) and, in T46, registers the device information of the PC 200, i.e., the MAC address "CCC", the legacy information "YES", and the connection information "YES", in the connection table 38 (S96).

T50 to T56 are the same as T20 to T26. The PC 300 which is a WFD apparatus, unlike the PC 200 which is a legacy apparatus, accepts selection of the SSID "YYY1" in T58, but does not accept input of a password. T60, T62 are the same as T30, T32, respectively.

In T70, the MFP 10 receives a Service Discovery request from the PC 300 (YES in S60), executes the first connection process (communication of Service Discovery, Provision Discovery, WSC Exchange, Authentication, Association, 4-way handshake), and establishes a Wi-Fi connection with the PC 300 (S62). In the WSC Exchange, the MFP 10 sends the first wireless setting information (i.e., the SSID "YYY1", the password "PPP1", etc.) to be used in the first WFDNW to the PC 300.

By establishing a Wi-Fi connection with the MFP 10, in T72, the PC 300 participates as a child station (i.e., CL) in the first WFDNW and, in T74, stores the first wireless setting information as the Persistent information. Thereby, in a case where the Wi-Fi connection with the MFP 10 is to be re-established after the Wi-Fi connection with the MFP 10 has been disconnected, the PC 300 is able to re-establish the Wi-Fi connection with the MFP 10 by using the Persistent information without the password "PPP1" being inputted by the user.

In T76, the MFP 10 stores the first wireless setting information in the memory 34 as the Persistent information, and, in T78, registers the device information of the PC 300, i.e., the MAC address "DDD", the legacy information "NO", and the connection information "YES", in the connection table 38 (S64).

(Establishment of Wi-Fi Connection Between MFP 10 and Mobile Terminal 100; FIG. 6 and FIG. 7)

Figure 5:
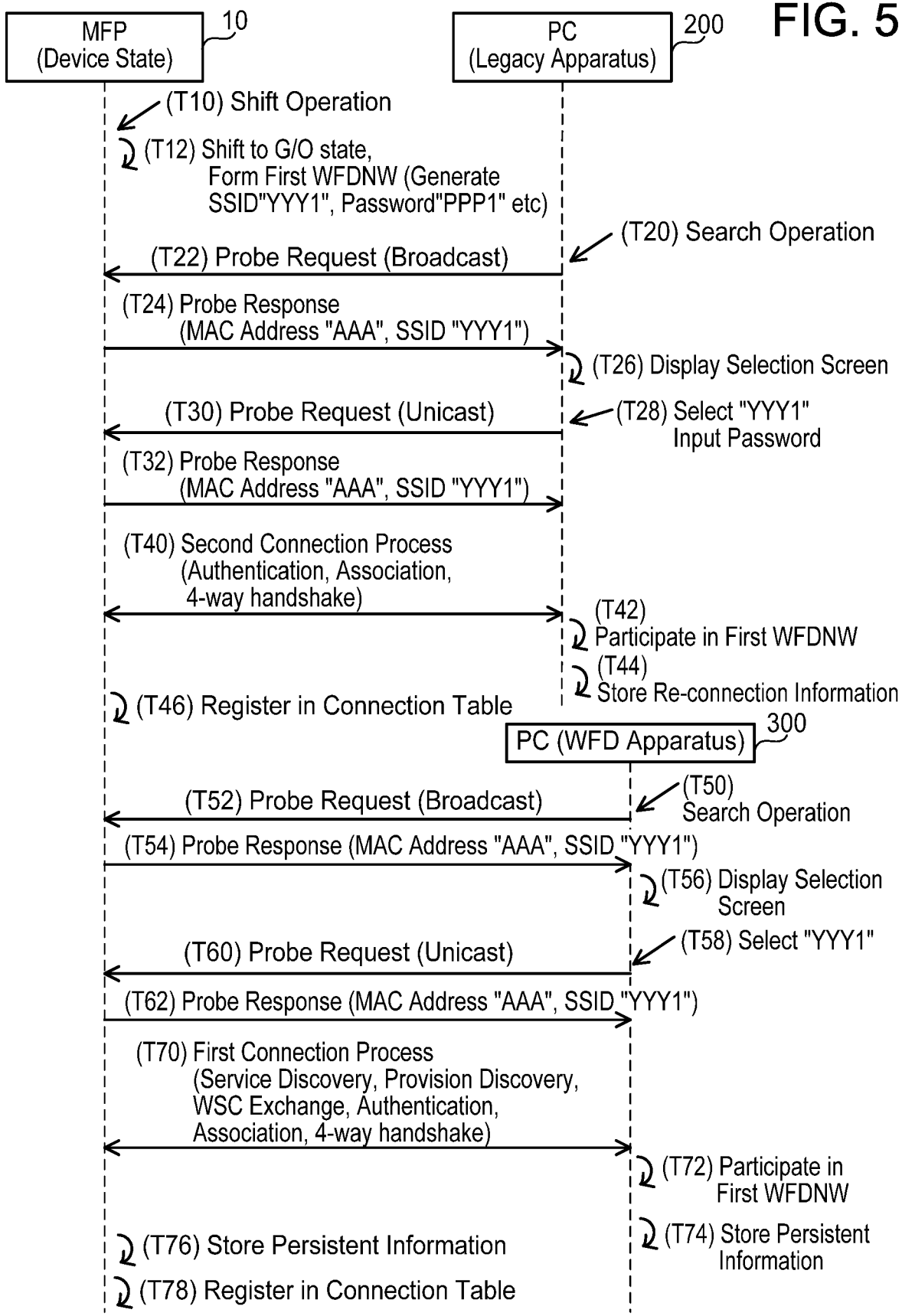
FIG. 5 shows a sequence view of a case in which a Wi-Fi connection is established between an MFP and a PC.
Figure 6:
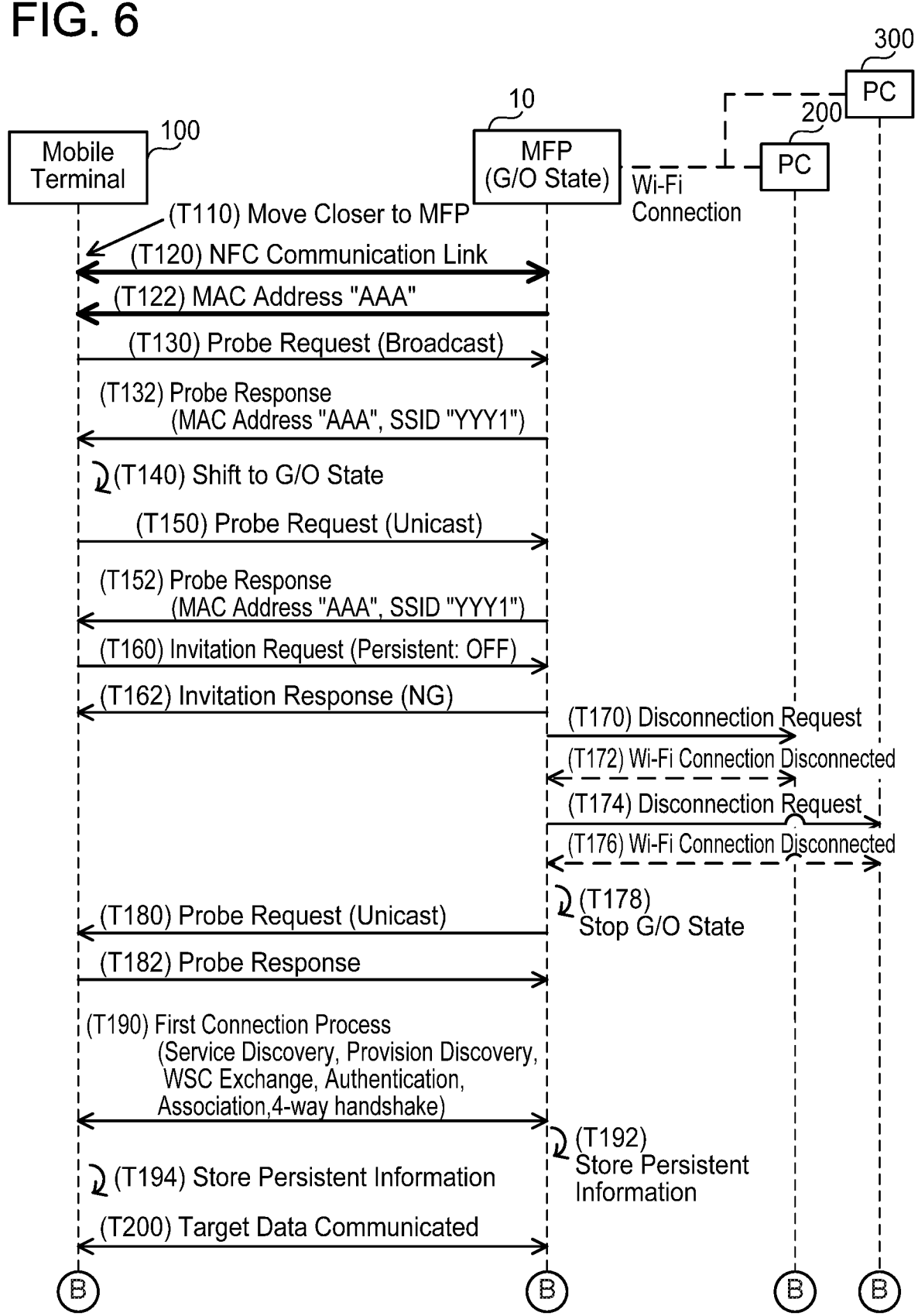
FIG. 6 shows a sequence view of a case in which an NFC link is established between a mobile terminal and an MFP.

An initial state of FIG. 6 is a state after execution of the process of FIG. 5, i.e., a state after the PC 200 and the PC 300 have participated as child stations in the first WFDNW in which the MFP 10 operates as a parent station (i.e., G/O). It should be noted that, in FIG. 6, a thick arrow indicates NFC communication, and a thin arrow indicates Wi-Fi communication.

When the user brings the mobile terminal 100 closer to the MFP 10 in T110, an NFC link is established between the MFP 10 and the mobile terminal 100 in T120 (YES in S20 of FIG. 2).

In T122, the MFP 10 sends the MAC address "AAA" to the mobile terminal 100 by using the NFC link (S22). T130, T132 are the same as T22, T24 of FIG. 5, respectively (YES in S30, S32).

Upon receiving a Probe response from the MFP 10 in T132, the mobile terminal 100 shifts to the G/O state in T140, forms the second WFDNW, and generates the second wireless setting information (i.e., SSID "YYY2", password "PPP2", etc.) to be used in the second WFDNW. T150, T152 are the same as T30, T32 of FIG. 5, respectively (YES in S40, S42). Upon receiving a Probe response from the MFP 10 in T152, the mobile terminal 100 determines that Persistent information including the MAC address "AAA" of the MFP 10 is not saved and, in T160, sends an Invitation request to the MFP 10.

Upon receiving the Invitation request in T160 (YES in S70 of FIG. 3), since Persistent information including the MAC address "BBB" of the mobile terminal 100 is not saved, the MFP 10 sends an Invitation response including NG information to the mobile terminal 100 (S72). Then, in T170, the MFP 10 sends a disconnection request to the PC 200, and disconnects the Wi-Fi connection with the PC 200 in T172. In T 174, the MFP 10 sends a disconnection request to the PC 300, and disconnects the Wi-Fi connection with the PC 300 in T176. Then, in T178, the MFP 10 shifts from the G/O state to the device state (S74). Thereby, the first WFDNW disappears. In that case, in T180, the MFP 10 sends a Probe request including the MAC address "BBB" of the mobile terminal 100 to the mobile terminal 100 (S80).

Upon receiving the Probe request from the MFP 10 in T180, the mobile terminal 100 sends a Probe response to the MFP 10 in T182.

Upon receiving the Probe response from the mobile terminal 100 in T182, the MFP 10 executes the first connection process with the mobile terminal 100 (communication of Service Discovery, Provision Discovery, WSC Exchange, Authentication, Association, 4-way handshake) in T190 (S82). In the WSC Exchange, the MFP 10 receives the second wireless setting information from the mobile terminal 100. Thereby, the Wi-Fi connection is established between the MFP 10 and the mobile terminal 100, and the MFP 10 participates as a child station (i.e., CL) in the second WFDNW.

In T192, the MFP 10 stores Persistent information including the MAC address "BBB" of the mobile terminal 100, and the second wireless setting information received in T190, in the memory 34.

Further, in T194, the mobile terminal 100 stores Persistent information including the MAC address "AAA" of the MFP 10 and the second wireless setting information sent to the MFP 10 in T190, in the memory 134.

In T200, the MFP 10 executes a communication of target data with the mobile terminal 100 by using the Wi-Fi connection. The target data is, for example, print data sent from the mobile terminal 100 to the MFP 10, or scan data sent from the MFP 10 to the mobile terminal 100.

Figure 7:
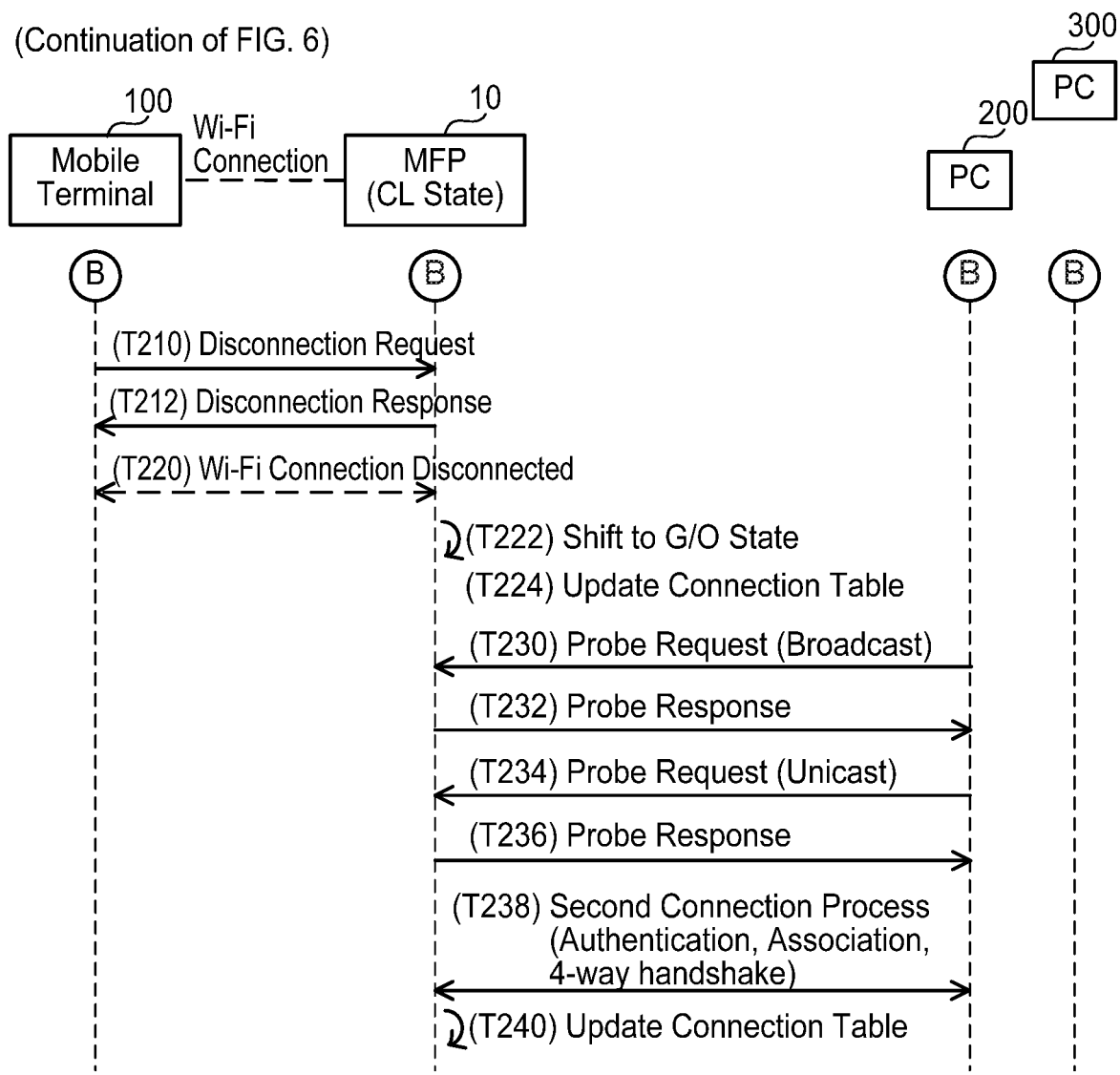
FIG. 7 shows a sequence view of a continuation of FIG. 6.

When the communication of the target data is completed, in T210 of FIG. 7, the MFP 10 receives a disconnection request from the mobile terminal 100. Thereby, the MFP 10 determines that communication of the target data has been completed (YES in S110 of FIG. 4) and, in T212, sends a disconnection response to the mobile terminal 100. As a result, in T220, the Wi-Fi connection between the MFP 10 and the mobile terminal 100 is disconnected (S112).

The MFP 10 determines that the PC 200 and the PC 300 were participating as child stations in the first WFDNW (YES in S120 of FIG. 4), and determines that the legacy apparatus (i.e., the PC 200) was participating as a child station in the first WFDNW (YES in S122) when the first WFDNW disappeared in T170 to T178 of FIG. 6 and, in T222, shifts from the device state to the G/O state. Thereby, the MFP 10 re-forms the first WFDNW, and re-generates the first wireless setting information (i.e., the SSID "YYY1", the password "PPP1", etc.) to be used in the first WFDNW. Then, in T224, the MFP 10 updates the connection information included in the device information of the PC 200 and the PC 300 from "YES" to "NO".

T230, T232, T234, T236 are the same as T22, T24, T30, T32 of FIG. 5, respectively. As described above, the PC 200 which is a legacy apparatus automatically executes a process for re-establishing the Wi-Fi connection with the MFP 10 after the Wi-Fi connection with the MFP 10 operating as G/O has been disconnected. Specifically, after the Wi-Fi connection with the MFP 10 has been disconnected, the PC 200 periodically sends a Probe request by broadcast, and re-establishes the Wi-Fi connection with the MFP 10 in a case of receiving a Probe response from the MFP 10 i.e., in a case of receiving a Probe response including the MAC address "AAA" in the re-connection information stored in the memory of the PC 200. That is, the Probe request sent in T230 is sent automatically without a search operation being executed by the user.

T238 is the same as T40 of FIG. 5. Here, the Wi-Fi connection is established between the MFP 10 and the PC 200 by using the re-connection information stored in the PC 200. Thereby, the PC 200 can again participate as a child station in the first WFDNW. In T240, the MFP 10 updates the connection information included in the device information of the PC 200 in the connection table 38 from "NO" to "YES".

It should be noted that, unlike the PC 200 that is a legacy apparatus, the PC 300 that is a WFD apparatus does not automatically send a Probe request by broadcast after the Wi-Fi connection with the MFP 10 has been disconnected. Accordingly, in the present case, the PC 300 does not again participate as a child station in the first WFDNW.

Effect of First Embodiment

According to the present embodiment, the MFP 10 shifts from the G/O state of operating as the parent station of the first WFDNW, to the CL state of participating as the child station in the second WFDNW in which the mobile terminal 100 operates as the parent station (T178, T190 of FIG. 6) and, after the communication of the target data with the mobile terminal 100 has been completed (T200), re-forms the first WFDNW (T222 of FIG. 7). In that case, the MFP 10 causes the PC 200 which had been participating as the child station in the first WFDNW, to again participate as the child station in the first WFDNW (T238). Accordingly, it is possible to reconstruct the first WFDNW in which the MFP 10 is operating as the parent station and the PC 200 is participating as the child station.

(Correspondence Relationship)

The MFP 10 is an example of "communication device". The PCs 200, 300 are an example of "first external device". The mobile terminal 100 is an example of "second external device". The Wi-Fi I/F 20 is an example of "wireless interface". The first WFDNW, the second WFDNW are an example of "first wireless network", "second wireless network", respectively. The Invitation request is an example of "belonging request". The CL state, the device state are an example of "first state", "second state", respectively. The print data, the scan data are examples of "target data". The WFD scheme, the Wi-Fi scheme without using the WFD scheme are an example of "first wireless communication scheme", "second wireless communication scheme".

Second Embodiment

In the present embodiment, the process of FIG. 4 differs from that of the first embodiment. Specifically, S220 to S226 are executed in a case where YES is determined in S120.

S220 is the same as S124. In S222, the CPU 32 determines whether the one or more WFD apparatuses were participating as a child station in the first WFDNW when the first WFDNW disappeared in S74 of FIG. 3. The CPU 32 determines YES in S222 and proceeds to S224 in a case where any participating device information in the connection table 38 includes the legacy information "NO", and determines NO in S222, skips S224, and proceeds to S226 in a case where any participating device information in the connection table 38 does not include the legacy information "NO". Below, participating device information including the legacy information "NO" is called "WFD participating device information".

In S224, the CPU 32 sends an Invitation request to each of the one or more WFD apparatuses specified by the one or more pieces of WFD participating device information in the connection table 38. The Invitation request is a command for requesting participation in the first WFDNW. Upon sending the Invitation request to the WFD apparatus, the CPU 32 receives an Invitation response from the WFD apparatus. In that case, the CPU 32 re-establishes the Wi-Fi connection with the WFD apparatus by using the Persistent information of the WFD apparatus in the memory 34. S226 is the same as S126.

(Specific Case)

Figure 8:
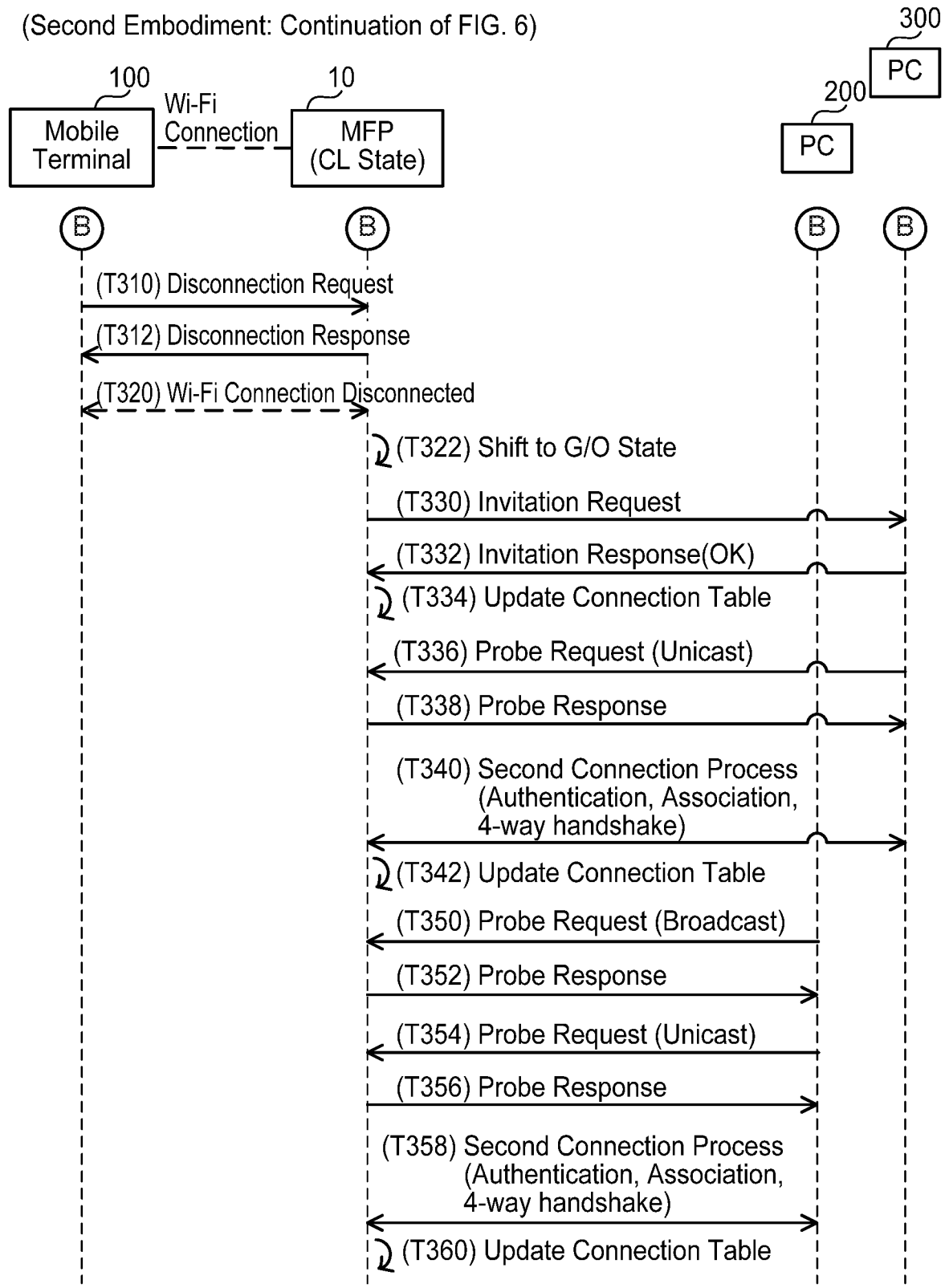
FIG. 8 shows a sequence view of a second embodiment.

Next, a case realized by the processes of FIG. 2 to FIG. 4 will be described with reference to FIG. 8. It should be noted that FIG. 8 is a continuation of FIG. 6, and the MFP 10 is in a state after participating as a child station in the second WFDNW in which the mobile terminal 100 operates as the parent station.

T310 to T322 are the same as T210 to T222 of FIG. 7. The MFP 10 determines that the WFD apparatus (i.e., the PC 300) was participating as a child station in the first WFDNW when the first WFDNW disappeared in T170 to T178 of FIG. 6 (YES in S222), and sends an Invitation request to the PC 300 in T330 (S224).

Since the PC 300 stores Persistent information including the MAC address "AAA" of the MFP 10 in the Invitation request (T74 of FIG. 5), upon receiving the Invitation request from the MFP 10 in T330, the PC 300 sends an Invitation response including OK information to the MFP 10 in T332.

Upon receiving the Invitation response from the PC 300, in T334, the MFP 10 updates the connection information of the PC 200 and the PC 300 in the connection table 38 from "YES" to "NO" (S226 of FIG. 4). T336, T338 are the same as T30, T32 of FIG. 5, respectively. Further, upon receiving an Authentication request from the PC 300 (NO in S70 of FIG. 3), in T340, the MFP 10 executes the second connection process by using the Persistent information (S90), and establishes a Wi-Fi connection with the PC 300 (S90). In that case, in T342, the MFP 10 updates the connection information of the PC 300 in the connection table 38 from "NO" to "YES" (S94). T350 to T360 are the same as T230 to T240 of FIG. 7.

Effect of Second Embodiment

The PC 300, which is a WFD apparatus, can establish a Wi-Fi connection with the MFP 10 in the case where a search operation is executed by the user, or in the case of receiving an Invitation request from the MFP 10 operating as the parent station. According to the present embodiment, the MFP 10 sends, to the PC 300, the Invitation request for re-establishing the Wi-Fi connection with the PC 300 (T330). Thereby, the MFP 10 can appropriately re-establish the Wi-Fi connection with the PC 300 even if the search operation is not executed on the PC 300 by the user (T340). According to the present embodiment, it is possible to reconstruct the first WFDNW in which the MFP 10 operates as the parent station, and the PCs 200, 300 participate as child stations.

(Correspondence Relationship)

The Invitation request sent in S224 of FIG. 4 is an example of "participation request".

Third Embodiment

In a third embodiment, the memory 34 of the MFP 10 stores an NFC flag 40. The NFC flag 40 indicates either of "ON" meaning that an NFC link has been established, or "OFF" meaning that an NFC link has not been established. Further, in the present embodiment, the MFP 10 executes a process of FIG. 9 instead of the process of FIG. 3. Further, the processes of FIG. 2, FIG. 4 differ from those of the first embodiment. It should be noted that processes in common in the embodiments have the same reference numbers applied thereto and an explanation thereof is omitted. It should be noted, in the present embodiment, that the state where the MFP 10 operates as a parent station in the first WFDNW is called "first G/O state".

As shown in FIG. 2, in S12, the CPU 32 shifts the MFP 10 from the device state to the first G/O state.

Then, the CPU 32 determines YES in S20 and, after executing S22, in S324 changes the NFC flag 40 from "OFF" to "ON".

Figure 9:
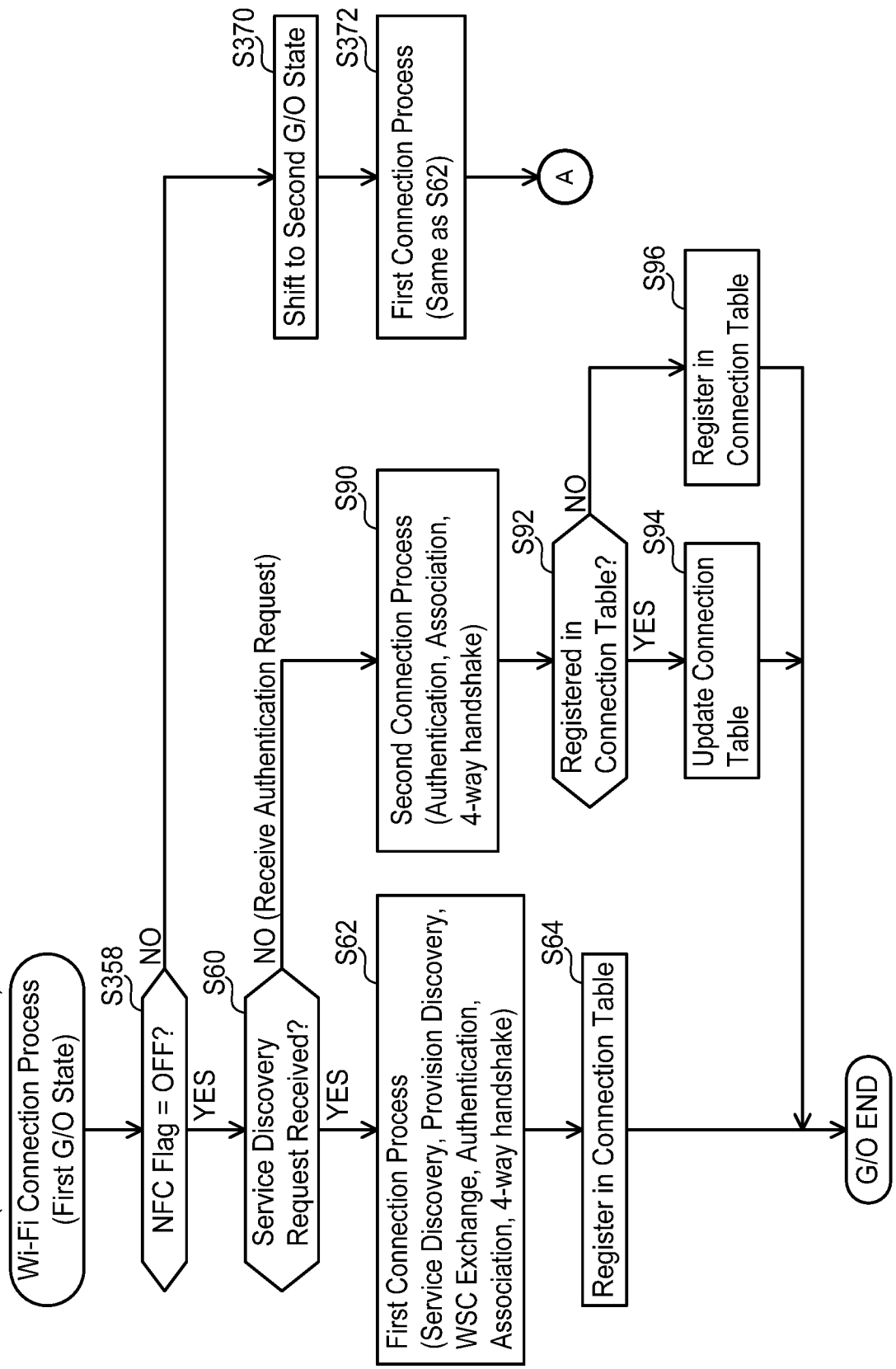
FIG. 9 shows a flowchart of a Wi-Fi connection process of a third embodiment.

(Wi-Fi Connection Process; FIG. 4, FIG. 9)

Next, contents of a process executed by the CPU 32 of the MFP 10 of the present embodiment will be described with reference to FIG. 4, FIG. 9. Firstly, the Wi-Fi connection process of the present embodiment will be described with reference to FIG. 9.

In S358, the CPU 32 determines whether the NFC flag 40 is "OFF". The CPU 32 proceeds to S60 in a case where the NFC flag 40 is "OFF" (YES in S358). On the other hand, the CPU 32 proceeds to S370 in a case where the NFC flag 40 is "ON" (NO in S358).

In S370, the CPU 32 shifts the MFP 10 from the first G/O state to a second G/O state. The second G/O state is a state in which the MFP 10 is operating as a parent station of a third WFDNW different from the first WFDNW. Specifically, the CPU 32 shifts the MFP 10 from the first G/O state to the device state, and further shifts the MFP 10 from the device state to the second G/O state. Thereby, the MFP 10 forms the third WFDNW, and generates third wireless setting information (i.e., a SSID "YYY3", a password "PPP3", etc.) to be used in the third WFDNW.

In S372, the CPU 32 executes a first connection process with the target apparatus the same as in S62. In the WSC Exchange, the CPU 32 sends the third wireless setting information to the target apparatus via the Wi-Fi I/F 20. Thereby, a Wi-Fi connection between the MFP 10 and the target apparatus is established, and the target apparatus participates as a child station in the third WFDNW. Then, the CPU 32 proceeds to S110 of FIG. 4.

In a case where YES is determined in S110 of FIG. 4, in S112, the CPU 32 shifts the MFP 10 from the second G/O state to the device state, and disconnects the Wi-Fi connection with the target apparatus. Then, in S424, the CPU 32 changes the NFC flag 40 from "ON" to "OFF".

(Specific Case)

Figure 10:
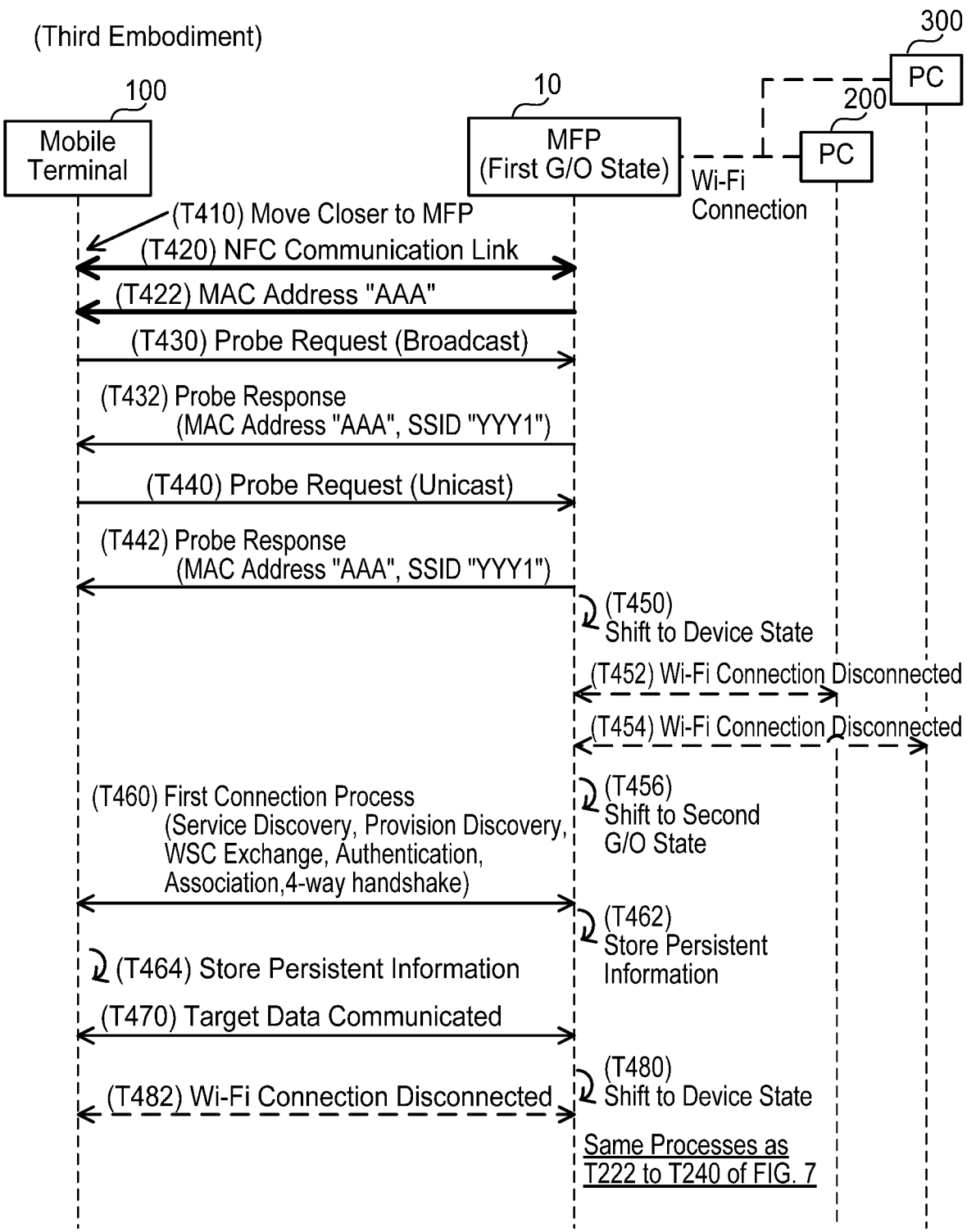
FIG. 10 shows a sequence view of the third embodiment.

Next, a specific case realized by the processes of FIG. 2, FIG. 4, FIG. 9 will be described with reference to FIG. 10. An initial state of FIG. 10 is the same as the initial state of FIG. 6. T410 to T432 are the same as T110 to T132 of FIG. 6. Further, T440, T442 are the same as T150, T152 of FIG. 6.

The MFP 10 determines that the NFC flag 40 is "ON" (NO in S358 of FIG. 9), shifts from the first G/O state to the device state in T450, disconnects the Wi-Fi connection with the PC 200 in T452, disconnects the Wi-Fi connection with the PC 300 in T454, and shifts from the device state to the second G/O state in T456 (S370). Thereby, the MFP 10 forms the third WFDNW, and generates third wireless setting information (i.e., the SSID "YYY3", the password "PPP3", etc.) to be used in the third WFDNW.

T460 is the same as T70 of FIG. 6 (S372). Here, the MFP 10 sends the third wireless setting information to the mobile terminal 100. T462 to T470 are the same as T192 to T200 of FIG. 6, except for the point that the third wireless setting information is stored as the Persistent information.

In T480, the MFP 10 shifts from the second G/O state to the device state. Thereby, in T482, the Wi-Fi connection between the MFP 10 and the mobile terminal 100 is disconnected (S112 of FIG. 4).

Effect of Third Embodiment

According to the present embodiment, in a situation where the PCs 200, 300 are participating as child stations in the first WFDNW, the MFP 10 shifts from the first G/O state to the second G/O state (T450, T456) in the case of receiving a Probe request from the mobile terminal 100 (T440). Thereby, the MFP 10 can establish a Wi-Fi connection with the mobile terminal 100, and allow the mobile terminal 100 to participate as a child station in the third WFDNW (T460).

Accordingly, the MFP 10 can execute a communication of the target data with the mobile terminal 100 by using the Wi-Fi connection.

(Correspondence Relationship)

The Probe response received in S40 after YES has been determined in S20 is an example of "belonging request". The first WFDNW, the third WFDNW are an example of "first wireless network", "second wireless network", respectively. The second G/O state is an example of "first state".

(Modification 1)

The CPU 32 may, only in a case where all the apparatuses participating in the first WFDNW are legacy apparatuses (S82 of FIG. 3) when causing the first WFDNW to disappear in S74 of FIG. 3, establish a Wi-Fi connection with the mobile terminal 100, and shift the operation state of the MFP 10 from the CL state to the G/O state after reception of the print data using the Wi-Fi connection has been completed (YES in S110), and after the Wi-Fi connection has been disconnected (S112).

(Modification 2)

"Communication device" may not be the MFP 10, but may be a printer capable of executing only the print function, a scanner capable of executing only the scan function, a PC, a mobile terminal, or the like.

(Modification 3)

In the above embodiment, each of the processes of FIG. 2 to FIG. 10 are realized by the CPU 32 of the MFP 10 executing the program 36 (i.e., software). Instead, at least one process of the processes of FIG. 2 to FIG. 10 may be realized by hardware such as a logic circuit.

What is claimed is:

1. A communication device comprising:
a wireless interface;
a processor; and
a memory storing computer-readable instructions therein, the computer-readable instructions, when executed by the processor, causing the communication device to:
in a specific situation where an operation state of the communication device is a parent station state in which the communication device operates as a parent station of a first wireless network, which is a first Wi-Fi network, and N number (N being an integer of 1 or more) of first external devices participate in the first wireless network as child stations, receive an Invitation request from a second external device different from the N number of the first external devices via the wireless interface, the Invitation request being a command according to a Wi-Fi scheme for requesting the communication device to belong to a second wireless network, which is a second Wi-Fi network, different from the first wireless network, wherein the first wireless network has a first network access identifier and the second wireless network has a second network access identifier different from the first network access identifier, the second wireless network being a network where the second external device operates as a parent station;
in a case where the Invitation request is received from the second external device in the specific situation, disconnect a wireless connection with each of the N number of the first external devices that are the child stations in the first wireless network;
in the case where the Invitation request is received from the second external device in the specific situation, shift the operation state of the communication device from the parent station state of the first wireless network to a first state where the communication device belongs to the second wireless network different from the first wireless network, the first state being a state where the communication device participates in the second wireless network as a child station;
execute a wireless communication of target data with the second external device via the wireless interface by using the second wireless network after the operation state of the communication device has been shifted from the parent station state to the first state;
shift the operation state of the communication device from the first state to the parent station state after the wireless communication of the target data has been completed; and
cause M number (M being an integer of 1 or more and less than or equal to N) of the first external devices among the N number of the first external devices to participate in the first wireless network again as child stations after the operation state of the communication device has been shifted from the first state to the parent station state.

2. The communication device as in claim 1, wherein:
the computer-readable instructions, when executed by the processor, further cause the communication device to:
in a case where the Invitation request is received from the second external device in the specific situation, send a disconnection request to each of the N number of the first external devices,
the wireless connection with each of the N number of the first external devices is disconnected due to the disconnection request having been sent to each of the N number of the first external devices,
the operation state of the communication device is shifted from the parent station state to a second state where the communication device does not belong to a wireless network in response to sending the disconnection request to each of the N number of the first external devices, and
the operation state of the communication device is shifted from the second state to the first state after the operation state of the communication device has been shifted from the parent station state to the second state.

3. The communication device as in claim 1, wherein:
the operation state of the communication device is not shifted from the first state to the parent station state after the wireless communication of the target data has been completed, in a case where all of the N number of the first external devices participated in the first wireless network as the child stations according to a first wireless communication scheme, and
the operation state of the communication device is shifted from the first state to the parent station state after the wireless communication of the target data has been completed, in a case where the all of the N number of the first external devices participated in the first wireless network as child stations according to a second wireless communication scheme different from the first wireless communication scheme.

4. The communication device as in claim 3, wherein
the operation state of the communication device is shifted from the first state to a second state where the communication device does not belong to a wireless network after the wireless communication of the target data has been completed, in a case where all of the N number of the first external devices participated in the first wireless network as the child stations according to the first wireless communication scheme.

5. The communication device as in claim 3, wherein:
the N is an integer of 2 or more, and
the operation state of the communication device is shifted from the first state to the parent station state after the wireless communication of the target data has been completed, in a specific case where N1 number (N1 being an integer of 1 or more and less than N) of the first external devices among the N number of the first external devices participated in the first wireless network as the child stations according to the first wireless communication scheme and N2 number (N2 being an integer of 1 or more and less than N) of the first external devices among the N number of the first external devices participated in the first wireless network as the child stations according to the second wireless communication scheme.

6. The communication device as in claim 5, wherein:
the computer-readable instructions, when executed by the processor, further cause the communication device to:
send a participation request to each of the N1 number of the first external devices via the wireless interface without sending the participation request to each of the N2 number of the first external devices, after the operation state of the communication device has been shifted from the first state to the parent station state in the specific case,
the participation request is a command for requesting the first external devices to participate in the first wireless network.

7. The communication device as in claim 3, wherein:
the first wireless communication scheme uses a WFD (abbreviation of Wi-Fi Direct (registered trademark)) scheme, and
the second wireless communication scheme does not use the WFD scheme.

8. The communication device as in claim 1, wherein:
the computer-readable instructions, when executed by the processor, further cause the communication device to:
send a participation request to at least one piece of the first external devices via the wireless interface after the operation state of the communication device has been shifted from the first state to the parent station state, so as to cause the M number of the first external devices among the N number of the first external devices to participate in the first wireless network again as the child stations, and
the participation request is a command for requesting the first external devices to participate in the first wireless network.

9. The communication device as in claim 1, wherein:
the operation state of the communication device is shifted from the parent station state to a second state where the communication device does not belong to a wireless network, wherein the wireless connection with each of the N number of the first external devices is disconnected due to the operation state of the communication device being shifted from the parent station state to the second state, and
the operation state of the communication device is shifted from the second state to the first state after the operation state of the communication device has been shifted from the parent station state to the second state.

10. A non-transitory computer-readable recording medium storing computer-readable instructions for a communication device, wherein the computer-readable instructions, when executed by a processor of the communication device, causing the communication device to:

in a specific situation where an operation state of the communication device is a parent station state in which the communication device operates as a parent station of a first wireless network, which is a first Wi-Fi network, and N number (N being an integer of 1 or more) of first external devices participate in the first wireless network as child stations, receive an Invitation request from a second external device different from the N number of the first external devices via a wireless interface of the communication device, the Invitation request being a command according to a Wi-Fi scheme for requesting the communication device to belong to a second wireless network, which is a second Wi-Fi network, different from the first wireless network, wherein the first wireless network has a first network access identifier and the second wireless network has a second network access identifier different from the first network access identifier, the second wireless network being a network where the second external device operates as a parent station;

in a case where the Invitation request is received from the second external device in the specific situation, disconnecting a wireless connection with each of the N number of the first external devices that are the child stations in the first wireless network;

in a case where the Invitation request is received from the second external device in the specific situation, shift the operation state of the communication device from the parent station state to a first state of the first wireless network where the communication device belongs to the second wireless network different from the first wireless network, the first state being a state where the communication device participates in the second wireless network as a child station;

execute a wireless communication of target data with the second external device via the wireless interface by using the second wireless network after the operation state of the communication device has been shifted from the parent station state to the first state;

shift the operation state of the communication device from the first state to the parent station state after the wireless communication of the target data has been completed; and cause M number (M being integer of 1 or more and less than or equal to N) of the first external devices among the N number of the first external devices to participate in the first wireless network again as child stations after the operation state of the communication device has been shifted from the first state to the parent station state.

11. A communication device comprising:

a first wireless interface;

a second wireless interface different from the first wireless interface, a communication speed of a wireless communication via the second wireless interface being slower than a communication speed of a wireless communication via the first wireless interface, a processor; and a memory storing computer-readable instructions therein, the computer-readable instructions, when executed by the processor, causing the communication device to:

in a specific situation where an operation state of the communication device is a parent station state in which the communication device operates as a parent station of a first wireless network, which is a first Wi-Fi network, and N number (N being an integer of 1 or more) of first external devices participate in the first wireless network as child stations, establish a wireless connection with a second external device different from the N number of the first external devices via the second wireless interface, in a case where the wireless connection with the second external device is established, store predetermined information indicating that the wireless connection with the second external device has been established in the memory, in the specific situation where the predetermined information is stored in the memory, receive a Probe request from the second external device via the first wireless interface, wherein the first wireless network has a first network access identifier and the a second wireless network, which is a second Wi-Fi network, has a second network access identifier different from the first network access identifier, the second wireless network being a network where the second external device operates as a child station;

in a case where the Probe request is received from the second external device in the specific situation and under the situation where the predetermined information is stored in the memory, disconnect a wireless connection with each of the N number of the first external devices that are the child stations in the first wireless network;

in the case where the Probe request is received from the second external device in the specific situation and under the situation where the predetermined information is stored in the memory, shift the operation state of the communication device from the parent station state of the first wireless network to a first state where the communication device belongs to the second wireless network different from the first wireless network, the first state being a state where the communication device participates in the second wireless network as a parent station;

execute a wireless communication of target data with the second external device via the first wireless interface by using the second wireless network after the operation state of the communication device has been shifted from the parent station state to the first state;

shift the operation state of the communication device from the first state to the parent station state after the wireless communication of the target data has been completed; and cause M number (M being an integer of 1 or more and less than or equal to N) of the first external devices among the N number of the first external devices to participate in the first wireless network again as child stations after the operation state of the communication device has been shifted from the first state to the parent station state.

12. The communication device as in claim 11, wherein:

the computer-readable instructions, when executed by the processor, further cause the communication device to:

in a case where the Probe request is received from the second external device in the specific situation and under the situation where the predetermined information is stored in the memory, send a disconnection request to each of the N number of the first external devices, the wireless connection with each of the N number of the first external devices is disconnected due to the disconnection request having been sent to each of the N number of the first external devices, the operation state of the communication device is shifted from the parent station state to a second state where the communication device does not belong to a wireless network in response to sending the disconnection request to each of the N number of the first external devices, and the operation state of the communication device is shifted from the second state to the first state after the operation state of the communication device has been shifted from the parent station state to the second state.

13. The communication device as in claim 11, wherein:

the operation state of the communication device is not shifted from the first state to the parent station state after the wireless communication of the target data has been completed, in a case where all of the N number of the first external devices participated in the first wireless network as the child stations according to a first wireless communication scheme, and the operation state of the communication device is shifted from the first state to the parent station state after the wireless communication of the target data has been completed, in a case where the all of the N number of the first external devices participated in the first wireless network as child stations according to a second wireless communication scheme different from the first wireless communication scheme.

14. The communication device as in claim 13, wherein the operation state of the communication device is shifted from the first state to a second state where the communication device does not belong to a wireless network after the wireless communication of the target data has been completed, in a case where all of the N number of the first external devices participated in the first wireless network as the child stations according to the first wireless communication scheme.

15. The communication device as in claim 13, wherein:

the N is an integer of 2 or more, and the operation state of the communication device is shifted from the first state to the parent station state after the wireless communication of the target data has been completed, in a specific case where N1 number (N1 being an integer of 1 or more and less than N) of the first external devices among the N number of the first external devices participated in the first wireless network as the child stations according to the first wireless communication scheme and N2 number (N2 being an integer of 1 or more and less than N) of the first external devices among the N number of the first external devices participated in the first wireless network as the child stations according to the second wireless communication scheme.

16. The communication device as in claim 15, wherein:

the computer-readable instructions, when executed by the processor, further cause the communication device to:

send a participation request to each of the N1 number of the first external devices via the first wireless interface without sending the participation request to each of the N2 number of the first external devices, after the operation state of the communication device has been shifted from the first state to the parent station state in the specific case, the participation request is a command for requesting the first external devices to participate in the first wireless network.

17. The communication device as in claim 13, wherein:

the first wireless communication scheme uses a WFD (abbreviation of Wi-Fi Direct (registered trademark)) scheme, and the second wireless communication scheme does not use the WFD scheme.

18. The communication device as in claim 11, wherein:

the computer-readable instructions, when executed by the processor, further cause the communication device to:

send a participation request to at least one piece of the first external devices via the first wireless interface after the operation state of the communication device has been shifted from the first state to the parent station state, so as to cause the M number of the first external devices among the N number of the first external devices to participate in the first wireless network again as the child stations, and the participation request is a command for requesting the first external devices to participate in the first wireless network.

19. The communication device as in claim 11, wherein:

the operation state of the communication device is shifted from the parent station state to a second state where the communication device does not belong to a wireless network, wherein the wireless connection with each of the N number of the first external devices is disconnected due to the operation state of the communication device being shifted from the parent station state to the second state, and the operation state of the communication device is shifted from the second state to the first state after the operation state of the communication device has been shifted from the parent station state to the second state.

* * * * *

UNITED STATES PATENT AND TRADEMARK OFFICE
CERTIFICATE OF CORRECTION

| | | |
|---|---|---|
| PATENT NO. | : 11,231,892 B2 | Page 1 of 1 |
| APPLICATION NO. | : 16/529982 | |
| DATED | : January 25, 2022 | |
| INVENTOR(S) | : Ryoya Tsuji et al. | |

It is certified that error appears in the above-identified patent and that said Letters Patent is hereby corrected as shown below:

In the Claims

Column 20, Claim 11, Line 17:
Please delete "and the a second" and insert --and a second--

Signed and Sealed this
Fifteenth Day of October, 2024

Katherine Kelly Vidal
*Director of the United States Patent and Trademark Office*